(12) United States Patent
Koros et al.

(10) Patent No.: US 9,346,011 B2
(45) Date of Patent: May 24, 2016

(54) HOLLOW FIBER CARBON MOLECULAR SIEVE MEMBRANE AND PREPARATION AND USE THEREOF

(71) Applicants: William J. Koros, Atlanta, GA (US); Liren Xu, Lake Jackson, TX (US); Mark K. Brayden, Baton Rouge, LA (US); Marcos V. Martinez, Rosharon, TX (US); Brien A. Stears, League City, TX (US)

(72) Inventors: William J. Koros, Atlanta, GA (US); Liren Xu, Lake Jackson, TX (US); Mark K. Brayden, Baton Rouge, LA (US); Marcos V. Martinez, Rosharon, TX (US); Brien A. Stears, League City, TX (US)

(73) Assignees: Dow Global Technologies LLC; Georgia Tech Research Corporation

( * ) Notice: Subject to any disclaimer, the term of this patent is extended or adjusted under 35 U.S.C. 154(b) by 0 days.

(21) Appl. No.: 14/391,014

(22) PCT Filed: Apr. 29, 2013

(86) PCT No.: PCT/US2013/038567
§ 371 (c)(1),
(2) Date: Oct. 7, 2014

(87) PCT Pub. No.: WO2013/165866
PCT Pub. Date: Nov. 7, 2013

(65) Prior Publication Data
US 2015/0053079 A1    Feb. 26, 2015

Related U.S. Application Data

(60) Provisional application No. 61/640,756, filed on May 1, 2012.

(51) Int. Cl.
*B01D 53/22* (2006.01)
*B01D 67/00* (2006.01)
(Continued)

(52) U.S. Cl.
CPC .......... *B01D 53/228* (2013.01); *B01D 67/0067* (2013.01); *B01D 67/0088* (2013.01);
(Continued)

(58) Field of Classification Search
CPC ............... B01D 53/226; B01D 53/228; B01D 67/0067; B01D 67/0081; B01D 67/0088; B01D 67/0097; B01D 69/08; B01D 69/087; B01D 71/021; B01D 71/42; B01D 2323/08; B01D 2323/22; B01D 2325/20; B29K 2023/00; B29K 2091/00; B29C 47/0004; B29D 22/00
USPC ........................................................... 95/50
See application file for complete search history.

(56) References Cited

U.S. PATENT DOCUMENTS

| | | | |
|---|---|---|---|
| 4,690,873 A | 9/1987 | Makino et al. | |
| 5,234,471 A | 8/1993 | Weinberg | |

(Continued)

FOREIGN PATENT DOCUMENTS

| | | | |
|---|---|---|---|
| WO | 01/34283 A1 | 5/2001 | |
| WO | 2010/042602 A1 | 4/2010 | |

(Continued)

OTHER PUBLICATIONS

Xu, Liren et al., "Matrimid derived carbon molecular sieve hollow fiber membranes for ethylene/ethane separation", Journal of Membrane Science, 2011, 380, pp. 138-147.*

(Continued)

*Primary Examiner* — Jason M Greene

(57) ABSTRACT

A hollow fiber carbon molecular sieve membrane, a process for preparing the hollow fiber carbon molecular sieve membrane, and a process for effecting separation of an olefin from a gaseous mixture that comprises the olefin in admixture with its corresponding paraffin and optionally one or more gaseous components selected from hydrogen, an olefin other than the olefin and a paraffin other than the corresponding paraffin. The process and membrane may also be used to effect separation of the olefin(s) from remaining feedstream components subsequent to an olefin-paraffin separation.

12 Claims, 1 Drawing Sheet

(51) Int. Cl.
  *B01D 69/08* (2006.01)
  *B01D 71/02* (2006.01)
  *B29C 47/00* (2006.01)
  *B29D 22/00* (2006.01)
  *B01D 71/42* (2006.01)
  *B29K 23/00* (2006.01)
  *B29K 91/00* (2006.01)

(52) U.S. Cl.
  CPC ............ *B01D 67/0097* (2013.01); *B01D 69/08* (2013.01); *B01D 69/087* (2013.01); *B01D 71/021* (2013.01); *B29C 47/0004* (2013.01); *B29D 22/00* (2013.01); *B01D 71/42* (2013.01); *B01D 2323/08* (2013.01); *B01D 2323/22* (2013.01); *B01D 2325/20* (2013.01); *B29K 2023/00* (2013.01); *B29K 2091/00* (2013.01)

(56) References Cited

U.S. PATENT DOCUMENTS

| | | | | |
|---|---|---|---|---|
| 5,288,304 | A * | 2/1994 | Koros | B01D 53/228 95/45 |
| 6,562,110 | B2 | 5/2003 | Koros et al. | |
| 6,705,113 | B2 | 3/2004 | Wei et al. | |
| 8,623,124 | B2 | 1/2014 | Hosseini et al. | |
| 2002/0053284 | A1 | 5/2002 | Koros et al. | |
| 2005/0235825 | A1* | 10/2005 | Tin | B01D 53/228 95/45 |
| 2011/0100211 | A1* | 5/2011 | Kiyono | B01D 53/228 95/45 |
| 2013/0152793 | A1* | 6/2013 | Bhuwania | B01D 53/228 96/4 |
| 2013/0333562 | A1* | 12/2013 | Koros | B01D 53/228 95/50 |
| 2015/0182921 | A1* | 7/2015 | Koros | B01D 67/0067 96/4 |

FOREIGN PATENT DOCUMENTS

| | | | | |
|---|---|---|---|---|
| WO | WO 2010/042602 A1 * | 4/2010 | ............ | B01D 71/64 |
| WO | 2011/053403 A1 | 5/2011 | | |
| WO | 2013/165866 A1 | 11/2013 | | |

OTHER PUBLICATIONS

Geiszler, Vincent et al., Effects of Polyimide Pyrolysis Conditions on Carbon Molecular Sieve Membrane Properties, Ind. Eng. Chem. Res., 1996, 35, pp. 2999-3003.*

Hayashi, Jun-ichiro et al., "Separation of Ethane/Ethylene and Propane/Propylene Systems with a Carbonized BPDA-pp'ODA Polyimide Membrane", Ind. Eng. Chem. Res., 1996, 35, pp. 4176-4181.*

Lagorsse et al; Aging study of carbon molecular sieve membranes, J of Membrane Science, 2007, pp. 494-502 V 310 No. 1-2, pp. 494-502, Elsevier.

Geiszler et al; Effects of Polyimide Pyrolysis Conditions on Carbon Molecular Sieve Membrane Properties, Ind Eng Chem Res. 1996, pp. 2999-3003 V 35.

Clausi et al; Formation of defect-free polyimide hollow fiber membrances for gas separatons, 2000 pp. 79-89, J of Membrane Science, Elsevier, V 167.

Liren et al, Matrimid derived carbon molecular sieve hollow fiber membranes for ethylene/ethane separation, J of Membrane Science, 2011, pp. 138-147, V 380 No. 1, Elsevier Scientific Publ. co.

Hayashi, et al Separationof Ethane/Ethylene and Propane Propylene Systems with a Carbonized BPDA-pp ODA Polyimide Membrane, Ind Eng Chem Res 1996 pp. 4176-4181 V 35 No. 11.

Kiyono et al, Effect of polymer precursors on carbon molecular sieve structure and separation performance properties, Carbon, 2010, pp. 4432-4441, V 48 No. 15, Elsevier Oxford GB.

Yoshino et al, Olefin/paraffin separation performance of carbonized membranes derived from an asymmetric hollow fiber membrane of 6FDA/BPDA-DDBT copolyimide, J of Membrane Science, 2003 p. 169-183 V 215 No. 1-2, Elsevier Scientific Publ. Co.

Saufi et al, Fabrication of carbon membranes for gas separation—a review, Carbon, 2004 pp. 241-259, V 42.

Kiyono et al, Effect of pyrolysis atmosphere on separation performance of carbon molecular sieve membranes, J of Membrane Science, 2010 pp. 2-10 V 359, No. 1-2, Elsevier Scientific Publ. co.

Fuertes et al, Carbon composite membranes from matrimid and Kapton polyimides for gas separation, Microporous and Mesoporous Materials, 1999, pp. 115-125, V 33 No. 1-3, Elsevier Science Pub, NY.

Qiu et al., Macromolecules 2011, 44, 6046.

PCT/US2013/038567, International Preliminary Report on Patentability, mailed Apr. 8, 2014.

PCT/US2013/038567, International Search Report & Written Opinion mailed Jul. 19, 2013.

* cited by examiner

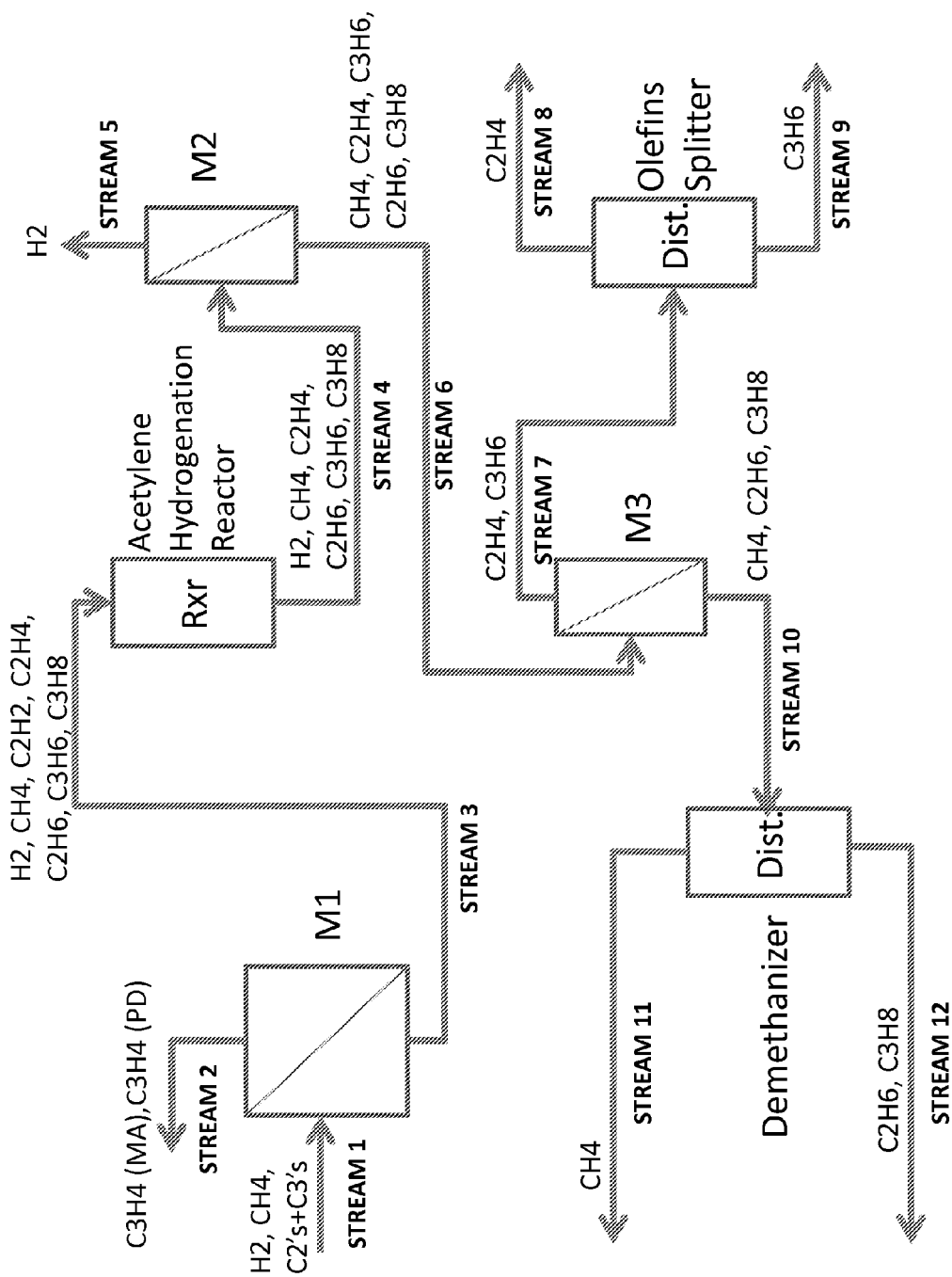

HOLLOW FIBER CARBON MOLECULAR SIEVE MEMBRANE AND PREPARATION AND USE THEREOF

The present application claims the benefit of U.S. Provisional Application No. 61/640,756, filed on May 1, 2012.

This application relates generally to carbon molecular sieve membranes, particularly to hollow fiber carbon molecular sieve membranes, their preparation and their use in effecting separation between an olefin and a paraffin, especially in effecting separation of two or more olefins from a feedstream that comprises the two olefins and their corresponding (same number of carbon atoms) paraffins (e.g. ethylene as an olefin and ethane as its corresponding paraffin). The feedstream may contain one or more other gaseous components such as hydrogen, carbon monoxide, carbon dioxide, methane, acetylene, methylacetylene, propadiene, acetaldehyde, butane, 1,3-butadiene, oxygen, nitrogen and helium. The same carbon molecular sieve membrane may be used in a second separation to separate the olefin(s) from other feedstream components that remain after separation of the paraffins.

A number of hydrocarbon product streams comprise a mixture of alkanes (also known as "paraffins") and alkenes (also known as "olefins") that range from those that contain one carbon atom ($C_1$) to those that contain six or more carbon atoms ($C_{6+}$). Mixture composition varies according to processes used to convert a feedstock to a hydrocarbon product stream, with a steam cracker yielding a different mixture composition than propane dehydrogenation. Those who desire to remove from the product stream a fraction that includes ethane and components such as methane, ethylene, hydrogen and propane, typically employ conventional technology known as "cryogenic distillation". See, e.g., U.S. Pat. No. 6,705,113. A drawback to cryogenic distillation on a commercial scale is its requirement for significant energy use and considerable capital expenditure.

As an alternative to separation via cryogenic distillation, United States Patent Application Publication (US) 2002/0053284 (Koros et al.) discloses a mixed matrix membrane capable of separating a desired gaseous component from gaseous mixtures, especially carbon dioxide ($CO_2$) from mixtures that include $CO_2$ and methane. The membrane comprises small, discrete carbon molecular sieving entities or particles encapsulated or incorporated into a polymeric membrane. The molecular sieving entity is derived from pyrolysis of any suitable polymeric material that results in an amorphous carbonized structure. Polymeric precursor materials suitable for pyrolysis can be prepared in any convenient form such as sheets, tubes, hollow fibers, or powder. Preferred carbon molecular sieve particles, prepared by pyrolysis of aromatic polyimides or cellulosic particles, are less than two micrometers (μm) in diameter. Pyrolysis temperatures range from a polymer's decomposition temperature up to its graphitization temperature (approximately 3000° C.). with 250° C. to 2500° C. being typical and 450° C. to 800° C. being preferred. Carbonization of polymer precursor powder to a specific structural morphology and carbon composition involves controlling heating protocol with three critical variables: temperature set points, rates at which those temperature set points are reached ("ramp") and amount of time at the temperature set points ("soak"). Soak times range up to 10 hours, with a minimum of one hour being typical. See also U.S. Pat. No. 6,562,110 (Koros et al.) for teachings related to a pyrolyzed body made from a precursor selected from the group consisting of polyetherimides, polyimides, 6FDA/BPDA-DAM, 6FDA-6FpDA and 6FDA-IPDA. 6FDA means hexafluoro isopropylidene bis(phthalic anhydride) or 5,5'-[2,2,2-trifluoro-1-(trifluoromethyl)ethylidene]-1,3-isobenzofurandion; IPDA means isopropylidenedianiline; DAM means 2,4,6-trimethyl-3,3-phenylenediamine; BPDA means 3,3',4,4'-biphenyl tetracarboxylic dianhydride; and 6FpDA means 4,4'-(hexafluoroisopropylidene)dianiline.

Patent Cooperation Treaty Application (WO) 2010/042602 (Hosseini et al.) provides teachings relative to polymer blends and carbonized polymer blends, with one polymer based upon monomers that contain an imidazole group (e.g. poly-2,2'-(1,3-phenylene)-5,5'-bibenzylimidazole (PBI)) along with a second polymer such as a polyimide (e.g. MATRIMID™ 5128 otherwise known as poly-[3,3',4,4'-benzophenone tetracarboxylic dianhydride or a polyimide that contains 6FDA groups), a polysulfone, a polyethersulfone, a polyarylate, polystyrene, a polyketone, a polyetherketone or a polyamide-imide in effecting separation of methane ($CH_4$), hydrogen ($H_2$) and $CO_2$.

U.S. Pat. No. 4,690,873 (Makino et al.) discloses a gas separating material that has a desirable $CO_2$ permeability coefficient and comprises an aromatic imide polymer. The aromatic imide polymer also reportedly exhibits selectivity in separating other gases such as oxygen, hydrogen, water vapor, hydrogen sulfide, sulfur dioxide and nitrogen dioxide from each other.

WO 2010/042602 (Hosseini et al.) provides teachings related to a composition that includes a blend of a first polymer having monomers each containing an imidazole group, and a second polymer (e.g. a polyimide or a polyamide-imide), either or both of the first and second polymers being crosslinked. The blend may be converted to a carbonized composition, a polymeric membrane or a carbon membrane (either in the form of a flat sheet or a hollow fiber). The polymeric and carbon membranes can be used to separate and purify gases or liquids. Illustrative polyimides include conventional and fluorinated polyimides, such as those marketed as MATRIMID™ 5218 and those that contain groups such as 6PDA groups. A carbon membrane can be used for $CO_2/CH_4$ separation. Carbonization of a membrane may occur via pyrolysis of a polymer blend precursor or a transparent film under vacuum (e.g. 0.1 millibar to 10 millibar).

Polymeric membranes materials find use in processes in which a feed gas mixture contacts a membrane's upstream side, resulting in a permeate mixture on the membrane's downstream side with a greater concentration of one of the components in the feed mixture than the composition of the original feed gas mixture. By maintaining a pressure differential between the upstream and downstream sides, one provides a driving force for permeation. The downstream side may be maintained at a vacuum (subatomospheric pressure) or at any pressure below the pressure of the upstream side.

Membrane performance, sometimes characterized by flux of a gas component across the membrane, may be expressed as a quantity called permeability (P), which is a pressure- and thickness-normalized flux of a given component. One can achieve separation of a gas mixture by a membrane that permits a faster permeation rate of one component (i.e. higher permeability) over that of another component. Membrane efficiency in enriching a component over another component in a permeate stream may be expressed as a quantity called selectivity (a ratio of permeabilities of gas components across the membrane, i.e. $P_A/P_B$, where A and B are the two components).

A desire exists for separation of olefins from paraffins present in a feedstream that contains at least one olefin, preferably at least two olefins, and corresponding paraffin(s). A desire also exists for separation of such olefin(s) from other components of a feedstream subsequent to an olefin/paraffin separation.

In some aspects, this invention is a process for preparing a hollow fiber carbon molecular sieve membrane, such process comprising a series of sequential steps as follows:

a. Using a combination of spinning conditions, converting a spinning dope to a hollow fiber membrane, the spinning dope comprising from 15 percent by weight (wt %) to 35 wt %, preferably from 20 wt % to 30 wt %. of a polyimide, from 20 wt % to 85 wt %, preferably from 40 wt % to 60 wt %, of low volatility water-soluble solvents for polyimide, from 0 wt % to 10 wt %, preferably from 0 wt % to 6.5 wt %, of non-volatile non-solvents, from 0 wt % to 40 wt %, preferably from 10 wt % to 30 wt %, of volatile water soluble non-solvents, and from 0 wt % to 85 wt %, preferably from 5 wt % to 15 wt %, of a volatile water soluble organic solvent, each wt % being based upon total weight of the spinning dope, and when added together for a spinning dope equal 100 wt %;

b. Pyrolyzing the hollow fiber membrane at a temperature within a range of from 450 degrees centigrade (° C.) to 900° C., preferably from 500° C. to 550° C., using a purge gas that comprises an inert gas and oxygen, the oxygen being present in an amount in an amount of from greater than 0 moles per million moles of purge gas to less than or equal to 50 moles per million moles of purge gas, the purge gas flowing at a rate within a range of from 2 centimeters per minute (cm/min) to 100 cm/min, preferably from 5 cm/min to 25 cm/min; and c. Subjecting the pyrolyzed hollow fiber membrane to a post-pyrolysis treatment that comprises conditioning the pyrolyzed hollow fiber membrane in an atmosphere that is substantially free of water, water vapor, gaseous organic compounds and organic liquids for a period of time at least 72 hours after cooling from the final pyrolysis temperature to room temperature before exposure to feed gas, The foregoing combination of sequential steps yields a hollow fiber carbon molecular sieve membrane that has an ethylene permeation at least 0.1 gas permeation units, a propylene permeance at least 0.1 gas permeation units, provided that the ethylene permeance is at least 2 times that of the ethane permeance and the propylene permeance is at least 4 times that of the propane permeance and further provided that propylene permeance is at least 1.5 times that of the ethane permeance. The foregoing hollow fiber carbon molecular sieve membrane may be used to effect olefin/paraffin separation as well as separation of such olefins from a feedstream that contains such olefin(s) and its/their corresponding paraffin(s) subsequent to an olefin/paraffin separation step.

In some aspects of this invention, the combination of spinning conditions for step c. comprises a spinning dope flow rate per threadline within a range of from 50 to 500 milliliters per hour (mL/hr), a bore fluid flow rate within a range of from 50 to 500 mL/hr, a spinneret temperature within a range of from 20° C. to 90° C., preferably from 50° C. to 70° C., a water quench temperature within a range of from 0° C. to 65° C., preferably from 20° C. to 50° C., an air gap within a range of from 0.1 centimeter (cm) to 50 cm, preferably from 1 cm to 30 cm, and a fiber take-up rate within a range of from 1 to 100 meters per minute (M/min), preferably from 5 M/min to 50 M/min In some aspects, sequential step c occurs under a subatmospheric pressure within a range of from 0.1 Pascals to 2000 Pascals and for a period of time at least 12 hours.

In some aspects, pyrolysis step b comprises substeps as follows:

1). Heating the hollow fiber membrane to the temperature; and

2). Maintaining the heated hollow fiber membrane at a maximum temperature within the range for a period of time within a range of from 1 minute to 500 minutes. The range is preferably from 500° C. to 560° C., more preferably of from 545° C. to 555° C.

In some aspects, this invention is a process for effecting separation of at least one olefin from a gaseous mixture that comprises the olefin in admixture with its corresponding paraffin and optionally one or more gaseous components selected from hydrogen, an olefin other than the olefin and a paraffin other than the corresponding paraffin, which process comprises interposing the hollow fiber carbon molecular sieve prepared as described above in a flow of the gaseous mixture under conditions sufficient to cause at least a portion of the olefin to pass through the sieve while blocking passage of at least a portion of the corresponding paraffin through the sieve. In a preferred variation of this process, the gaseous mixture comprises at least two olefins and their corresponding paraffins, and the conditions are sufficient to cause at least a portion of each of the two olefins passes through the sieve while blocking passage of at least a portion of one of the corresponding paraffins through the sieve. In a still more preferred variation, the two olefins are ethylene and propylene and the corresponding paraffins are ethane and propane.

In some embodiments, the foregoing process of effecting separation of an olefin or at least two olefins from a gaseous mixture that comprises said olefin(s) in admixture with its or their corresponding paraffins is modified to accommodate treatment of a gaseous mixture that also comprises at least one additional gaseous component selected from a group consisting of acetylene, hydrogen, propadiene and methylacetylene and the conditions are sufficient to cause at least a portion of the additional gaseous component(s) and at least a portion of the olefin(s) to pass through the sieve while blocking passage of at least a portion of the corresponding paraffins through the sieve. A preferred variation of the modified process comprises an additional step wherein gases that pass through the sieve are subjected to a second separation using either the same hollow fiber carbon molecular sieve prepared as described above or a second hollow fiber carbon molecular sieve prepared as described above, said second separation occurring under conditions sufficient to cause at least a portion of the additional gaseous component(s) to pass through the hollow fiber carbon molecular sieve while blocking passage of at least a portion of the olefin(s) through the hollow fiber carbon molecular sieve.

BRIEF DESCRIPTION OF THE DRAWING

FIG. 1 is a schematic illustration of a process flow scheme that shows a combination of three hollow fiber carbon molecular sieve membrane units M1, M2 and M3 in combination with an acetylene hydrogenation reactor (Rxr) and two distillation units ("Demethanizer Dist" and "Olefins Splitter Dist") and associated feed streams and product or output streams from each of said units and the reactor.

Suitable low volatility water-soluble solvents are selected from a group consisting of N-methyl-2-pyrrolidone, dimethylacetamide, dimethylformamide and combinations thereof.

Suitable non-volatile non-solvents are selected from a group consisting of lithium nitrate, poly(vinylpyrrolidone) and combinations thereof.

Suitable volatile water soluble non-solvents are selected from a group consisting of ethanol, methanol, propanol, water and combinations thereof.

Suitable volatile water soluble organic solvents are selected from tetrahydrofuran, acetone and combinations thereof.

The polyimide is suitably a conventional and fluorinated polyimide. Desirable polyimides contain at least two different moieties selected from 2,4,6-trimethyl-1,3-phenylene diamine (DAM), oxydianaline (ODA), dimethyl-3,7-diaminodiphenyl-thiophene-5,5'-dioxide (DDBT), 3,5-diaminobenzoic acid (DABA), 2.3,5,6-tetramethyl-1,4-phenylene diamine (durene), meta-phenylenediamine (m-PDA), 2,4-diaminotolune (2,4-DAT), tetramethylmethylenedianaline (TMMDA), 4,4'-diamino 2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), and benzophenone tetracarboxylic dianhydride (BTDA), with two or more of 6FDA, BPDA and DAM being preferred.

A particularly useful polyimide, designated as 6FDA/BPDA-DAM, may be synthesized via thermal or chemical processes from a combination of three monomers: DAM; 6FDA, and BPDA, each commercially available for example from Sigma-Aldrich Corporation. Formula 1 below shows a representative structure for 6FDA/BPDA-DAM, with a potential for adjusting the ratio between X and Y to tune polymer properties. As used in examples below, a 1:1 ratio of component X and component Y may also abbreviated as 6FDA/BPDA(1:1)-DAM.

gas pair, typically oxygen ($O_2$) and nitrogen ($N_2$), through a hollow fiber membrane is at least 90 percent of the selectivity for the same gas pair through a dense film prepared from the same composition as that used to make the polymeric precursor hollow fiber membrane. By way of illustration, a 6FDA/BPDA(1:1)-DAM polymer has an intrinsic $O_2/N_2$ selectivity (also known as "dense film selectivity") of 4.1 while 6FDA/BPDA(1:1)-DAM fibers prepared as in Ex 1 below, have an $O_2/N_2$ selectivity of 4.8. The fiber selectivity of 4.8 is well above the defect-free threshold as 90% of 4.1 is 3.7.

Hollow fibers and hollow fiber membranes may be prepared by conventional procedures, especially coextrusion procedures including, for example, a dry-jet wet spinning process (in which an air gap exists between the tip of the spinneret and the coagulation or quench bath) or a wet spinning process (with zero air-gap distance). The example section below illustrates in greater detail a suitable dry-jet wet spinning process preferred for use in this invention.

Carbon membranes, sometimes referred to as carbon molecular sieves, whether in the form of a sheet or a hollow fiber, are formed through pyrolysis of polymeric precursors. Their porous structure allows for permeability (productivity in terms of effecting separation of, for example, gases) while their molecular sieving network provides efficient size and shape discrimination of molecules (selectivity). In addition, carbon membranes have sufficient chemical and thermal stability for use in this invention.

Pyrolysis conditions influence carbon membrane physical properties and, accordingly, are chosen with care. Polymeric Formula 1

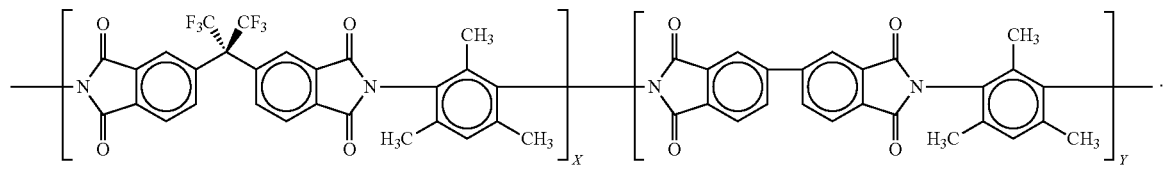

Chemical structure of 6FDA/BPDA-DAM

A second particularly useful polyimide, designated as 6FDA-DAM lacks BPDA such that Y equals zero in Formula 1 above. Formula 2 below shows a representative structure for this polyimide.

Formula 2

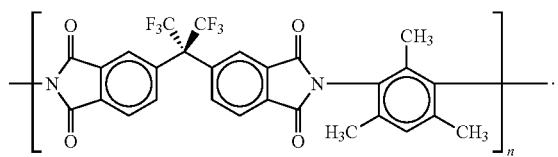

Chemical structure of 6FDA-DAM

A third useful polyimide is MATRIMID™ 5218 (Huntsman Advanced Materials), a commercially available polyimide that is a copolymer of 3,3',4,4'-benzo-phenonetetracarboxylic acid dianhydride and 5(6)-amino-1-(4'-aminophenyl)-1,3,3-trimethylindane (BTDA-DAPI).

Preferred polymeric precursor hollow fiber membranes, the hollow fibers as produced but not pyrolyzed, are substantially defect-free. "Defect-free" means that selectivity of a precursors can be carbonized under various inert gas purge or vacuum conditions, preferably under inert gas purge conditions, for the vacuum pyrolysis, preferably at low pressures (e.g. less than 0.1 millibar). Any suitable supporting means for holding the membrane precursor and resulting carbon membrane may be used during the pyrolysis including sandwiching between two metallic wire meshes or using a stainless steel mesh plate in combination with stainless steel wires as described below. The example section found below contains two illustrative heating protocols up to 500 degrees centigrade (° C.) and up to 550° C. with specified heating rates typically controlled by a ramp function of the oven. A dwell time at the final temperature (e.g. 550° C.) of two hours provides satisfactory results. Thereafter, the membranes are cooled and recovered as described below.

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [$cm^3$ (STP) cm]/[$cm^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of asymmetric hollow fiber membranes and is typically measured in Gas Permeation Units (GPU) (1 GPU=$10^{-6}$ [cm$^3$ (STP)]/[cm$^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

A polymeric powder preferably serves as a starting material for preparing carbon membranes of various aspects of this invention. The polymeric powder can be formed, for example, by milling a polyimide powder using conventional methodology. Alternatively, polymeric films can be formed by solution casting a polyimide solution via conventional methodology such as by casting on a flat glass thickness with a variable thickness polymer film applicator. Suitable polyimides can be formed, for example, by reacting suitable dianhydrides with diamines, preferably an aromatic anhydride with an aromatic amine via condensation reactions to form an aromatic polyimide. Aromatic polyimides have rigid backbone structures with high melting point and high glass transition temperatures (e.g. in excess of 200° C.).

The olefin-paraffin hollow fiber carbon molecular sieve membrane prepared as described herein as a number of practical utilities, one of which is emplacement and use of a membrane module containing the membrane before a deethanizer unit commonly used by the petrochemical industry. Such a use has potential for significant capital and operational savings in purification of ethylene and propylene.

As noted above, FIG. 1 is a schematic illustration of a process flow scheme that incorporates use of a combination of three hollow fiber carbon molecular sieve membrane units M1, M2 and M3 in combination with an acetylene hydrogenation reactor (Rxr) and two distillation units ("Demethanizer Dist" and "Olefins Splitter Dist") and associated feed streams and product or output streams from each of said units and the reactor. The process flow scheme differs from a conventional process flow scheme that begins with the same stream one and uses at least four distillation units (nominally one for demethanizing or "Demethanizer Dist", one for deethanizing or "Deethanizer Dist", one for ethylene purification or "C2 Splitter" and one for propylene purification or "C3 Splitter"). The C3 splitter unit may comprise two or more distillation columns due to the number of stages needed to effect separation of propane and propylene due to their very similar volatilities or boiling points. The FIG. 1 schematic illustration shows just two distillation columns, one for demethanizing, the same or nearly the same as in the conventional process flow scheme, and one effecting an olefin split in place of both the C2 Splitter and C3 Splitter of the conventional process flow scheme.

In FIG. 1, Stream 1 contains hydrogen ($H_2$), methane ($CH_4$), ethane, ethylene and acetylene ($C_2$'s), and propane, propylene, methylacetylene, and propadiene ($C_3$'s). Stream 1 typifies the lighter of two "cracked gas" fractions from an ethylene production unit (not shown), which fraction is sometimes referred to as an overhead stream from a depropanizer unit. Plants built during the period from approximately 1990 to date for cracking primarily liquid feedstocks ("naphtha cracker plants") or a mixture of feeds ("flexicracker plants") typically have a depropanizer (not shown) as their first purification column.

When using a membrane to effect a separation, one portion, referred to as "permeate", passes through the membrane, while another portion, referred to as "retentate", largely, if not completely, fails to pass through the membrane. For membrane unit M1, the permeate, designated as "STREAM 2", contains methylacetylene ($C_3H_4$ or "MA"), and propadiene ($C_3H_4$ or "PD") and the retentate, designated as "STREAM 3", contains hydrogen ($H_2$), methane ($CH_4$), ethylene ($C_2H_4$), ethane ($C_2H_6$), acetylene ($C_2H_2$), propylene ($C_3H_6$), and propane ($C_3H_8$).

STREAM 3 serves as a feedstream to an "acetylene hydrogenation reactor" in order to remove acetylene, deemed a product impurity in a final ethylene product. Output from the reactor (Rxr), designated as "STREAM 4", typically contains less than one part per million parts by weight of $C_2H_2$ based upon total STREAM 4 weight.

STREAM 4 serves as a feedstream to membrane unit M2, preferably containing the same hollow fiber carbon molecular sieve material as in M1, to effect separation of $H_2$ as permeate or STREAM 5 from remaining components of STREAM 4 as retentate to yield STREAM 6 that has very little, preferably no, $H_2$.

Feed STREAM 6 to membrane unit M3, again preferably containing the same hollow fiber carbon molecular sieve material as in M1, to effect an olefin-paraffin separation with olefins ($C_2H_4$ and $C_3H_6$) being present in the permeate or STREAM 7 and paraffins ($CH_4$, $C_2H_6$ and $C_3H_8$) being present as M3 retentate or STREAM 10.

Feed STREAM 7 to an olefins splitter distillation unit to effect separation of STREAM 7 into STREAM 8 ($C_2H_4$) and STREAM 9 ($C_3H_6$). Feed STREAM 10 into a demethanizer distillation unit to effect separation of STREAM 10 into STREAM 11 ($CH_4$) and STREAM 12 ($C_2H_6$ and $C_3H_8$). While not shown, $CH_4$ STREAM 11 may be sent to an off gas system to be used as fuel, while the combined ethane and propane stream may be sent to an ethylene furnace as a recycle feedstock to produce additional cracked gas.

The following examples illustrate, but do not limit any aspect of this invention.

EXAMPLE (EX) 1

Synthesize 6FDA/BPDA-DAM in powder form by condensation of dianhydrides 6FDA and BPDA with diamine (DAM) in a ratio of dianhydrides to diamine of 1:1. The synthesis is a two-step reaction in which the first step produces a high molecular weight polyamic acid at low temperature (~5° C.), and the second or chemical imidization step followed by a post-chemical drying step at 210° C. under vacuum yields 6FDA/BPDA-DAM. See Qiu et al., *Macromolecules* 2011, 44, 6046.

Dry the 6FDA/BPDA-DAM powder in a vacuum oven operating at a set temperature of 110° C. for 12 hours to remove moisture and residual volatile solvents.

Prepare a visually homogeneous spinning dope by placing a combination of 25 percent by weight (wt %) 6FDA/BPDA-DAM, 43 wt % N-methyl-2-pyrrolidone (NMP), 22 wt % ethanol and 10 wt % tetrahydrofuran (THF), each wt % being based upon total spinning dope weight, in a Qorpak™ glass bottle sealed with a polytetrafluoroethylene (TEFLON™) cap and placing the sealed bottle on a roller operating at a speed of 5 revolutions per minute (rpm) for a period of 15 days Load the homogeneous dope into a 500 milliliter (mL) syringe pump and allow the dope to degas overnight by heating the pump to a set point temperature of 50° C. using a heating tape.

Load bore fluid (80 wt % NMP and 20 wt % water, based on total bore fluid weight) into a separate 100 mL syringe pump and then co-extrude the dope and bore fluid through a spinneret operating at a flow rate for each of 100 milliliters per hour (mL/hr), filtering both the bore fluid and the dope in line between delivery pumps and the spinneret using 40 μm and 2 μm metal filters. Effect temperature control using thermocouples and heating tape placed on the spinneret, dope filters and dope pump at a set point temperature of 70° C.

After passing through a two centimeter (cm) air gap, immerse nascent fibers formed by the spinneret into a water quench bath (50° C.) and allow the fibers to phase separate. Collect the fibers using a 0.32 meter (M) diameter polyethylene drum passing over TEFLON guides and operating at a take-up rate of five meters per minute (M/min)

Cut the fibers from the drum, then rinse the fibers at least four times in separate water baths over a span of 48 hours. Place the rinsed fibers in glass containers and effect solvent exchange three times with methanol for 20 minutes and then hexane for 20 minutes before recovering the fibers and drying them under vacuum at a set point temperature of 110° C. for one hour.

Prior to pyrolysis, test a sample quantity of the above fibers (also known as "precursor fibers") for skin integrity after potting them in a membrane module. Place one or more hollow precursor fibers into a ¼ inch (0.64 cm) (outside diameter, OD) stainless steel tubing. Connect each tubing end to a ¼ inch (0.64 cm) stainless steel tee; and then connect each tee to ¼ inch (0.64 cm) female and male NPT tube adapters; and seal NPT connections with epoxy. Perform pure gas permeation tests in a constant-volume system maintained at 35° C. For each permeation test, first evacuate the entire system and perform a leak rate test to ensure that leakage is less than 1 percent of the permeation rate of the slowest gas. After evacuation, pressurize the upstream end (end closest to feed source) of the tube with feed gas (e.g. pure oxygen or pure nitrogen) while keeping the downstream end (end furthest from feed source) under vacuum. Record the pressure rise in a constant, known downstream volume over time using LABVIEW software (National Instruments, Austin, Tex.) until reaching steady state. Determine permeance of each gas through the membrane by the rate of pressure rise, the membrane area and the pressure difference across the membrane. Calculate selectivity of each gas pair as a ratio of the individual gas permeance.

Place precursor hollow fibers on a stainless steel wire mesh plate and bind them separately to the plate using stainless steel wire. Insert the combination of hollow fibers and mesh plate into a quartz tube that sits in a tube furnace. Effect pyrolysis under an inert gas (argon flowing at a rate of 200 standard cubic centimeters per minute (sccm)) purge after first purging the tube furnace for a minimum of six hours to remove oxygen from the system. Use the following heating protocol for the pyrolysis: a) Heat from 50° C. to 250° C. at a ramp rate of 13.3° C. per minute (° C./min); b) Heat from 250° C. to 535° C. at a ramp rate of 3.85° C./min; c) Heat from 535° C. to 550° C. at a ramp rate of 0.25° C./min; and d) Soak at 550° C. for 2 hours. After the soak time, turn off heating and allow the membrane to cool in place under the flowing argon to 40° C. before removing the mesh support from the furnace and recovering the pyrolyzed fibers.

Prepare membrane modules as detailed above, but use pyrolyzed fibers in place of precursor fibers.

Place the membrane modules that contain pyrolyzed fibers into a constant volume permeation system to measure gas permeation at 35° C. using ethylene and ethane at 100 pounds per square inch absolute (psia) (689.6 kilopascals (kPa), propylene and propane at 50 psia (344.7 kPa) as test gases. Table 1 below summarizes transport properties.

TABLE 1*

| $(P/l)_{C2H4}$ | $(P/l)_{C2H6}$ | $(P/l)_{C3H6}$ | $(P/l)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 27.5 | 9.1 | 38.9 | 2.78 | 3.0 | 14.4 | 0.71 | 4.3 |

*Permeance unit: gas permeation unit (GPU, 1GPU = $10^{-6}$ [cm$^3$(STP)]/[cm$^2$ s cmHg])

The data presented in Table 1 above demonstrate that the membrane contained in the pyrolyzed fiber membrane module has an olefins-selective feature in that ethylene and propylene permeance values both exceed those of their corresponding paraffins ethane and propane. While permeance for propylene exceeds that of ethylene, both propylene and ethylene have permeance values in excess of unity. These results suggest that when one feeds a mixed feedstream of ethane, propane, ethylene and propylene to the membrane that the olefins, ethylene and propylene, will tend to pass through the membrane thereby yielding a permeate stream enriched in both ethylene and propylene relative to the feedstream and that the paraffins, ethane and propane, will tend to remain on the upstream side of the membrane such that they are part of retentate stream.

EX 2

Replicate Ex 1, but place the membrane in a sealed atmosphere that is free of water, water vapor, gaseous organic compounds and organic liquids for one year before testing the membrane as in Ex 1. In addition, in order to avoid concentration polarization, keep the retentate stream flow rate at least 100 times higher than that of the permeate flow rate. Use gas chromatography (GC) and an HP5890 GC unit with a sampling pressure in a range of from 5 torr (666.6 pascal (Pa) to 10 torr (1333.2 Pa) to effect composition analysis of the permeate and calculate selectivity based upon permeate composition. Since the permeate side pressure is very low compared to the feed pressure, use "separation factor", calculated by the following equation, to describe selectivity:

$$\alpha_{i/j} = \frac{(y_i/y_j)}{(x_i/x_j)}$$

In the equation, $y_i$ and $y_j$ are downstream mole fractions of gases i and j, respectively, and $x_i$ and $x_j$ are upstream mole fractions of gases i and j. Table 2 below summarizes transport properties.

TABLE 2*

| $(P/l)_{C2H4}$ | $(P/l)_{C2H6}$ | $(P/l)_{C3H6}$ | $(P/l)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 8.3 | 1.8 | 9.5 | 0.43 | 4.5 | 22 | 0.87 | 5.3 |

*Permeance unit: gas permeation unit (GPU)

The results in Table 2, when compared to those in Table 1, show a reduction in all gas permeance levels, but the selectivity values are stable or slightly increased in Table 2 over those in Table 1.

EX 3

Evaluate the membrane of Ex 2 for multiple-component olefin/paraffin mixture separation using a feed mixture that comprises demethanizer bottoms, a gas mixture that predominantly contains two and three carbon atom hydrocarbons and an apparatus that maintains a constant pressure and flow throughout the evaluation. Evaluate permeation at 25° C. with a feed pressure of 60 psig (413.7 kPa) and 30 psig (206.8 kPa) argon as permeate sweep and use gas chromatography to analyze the permeate. Collect permeated gas by sweeping with argon into two gas sample valves on two AGILENT™ 6890 GCs. Perform analysis for hydrocarbons with a CHROMPAK™ alumina/potassium chloride column using helium carrier gas and a flame ionization detector (FID). Perform analysis for gases such as hydrogen and argon that are not detected via FID using helium as a carrier gas and one of the GCs which is equipped with an HP-Molsiv column and a thermal conductivity detector (TCD). Table 3 below shows feed and permeate compositions. Table 4 below summarizes transport properties.

TABLE 3

| Gas | Feed (mol %) | Permeate (mol %) |
|---|---|---|
| $C_2H_4$ | 54.4 | 75.3 |
| $C_3H_6$ | 14.8 | 16 |
| $C_2H_6$ | 17.1 | 7.2 |
| $C_3H_8$ | 13.5 | 0.7 |
| Other hydrocarbons | 0.2 | 0.8 |

TABLE 4*

| $(P/l)_{C2H4}$ | $(P/l)_{C2H6}$ | $(P/l)_{C3H6}$ | $(P/l)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 8.6 | 2.6 | 6.7 | 0.308 | 3.3 | 22 | 1.3 | 2.6 |

*Permeance unit: gas permeation unit (GPU)

EX 4

Replicate Ex 3, but change the feed mixture to a gas mixture that contains hydrogen and methane, a gas mixture containing six components as shown in Table 5 below that is typical of that fed to a demethanizer unit in petrochemical industry operations. Table 6 below summarizes transport properties.

TABLE 5

| Gas | Feed (mol %) | Permeate (mol %) |
|---|---|---|
| $H_2$ | 26.9 | 66.4 |
| $CH_4$ | 24.1 | 4.8 |

TABLE 5-continued

| Gas | Feed (mol %) | Permeate (mol %) |
|---|---|---|
| $C_2H_4$ | 28.4 | 22.3 |
| $C_3H_6$ | 6.0 | 4.2 |
| $C_2H_6$ | 7.8 | 1.9 |
| $C_3H_8$ | 6.7 | 0.3 |
| Other hydrocarbons | 0.1 | 0.1 |

TABLE 6*

| $(P/l)_{H2}$ | $(P/l)_{CH4}$ | $(P/l)_{C2H4}$ | $(P/l)_{C2H6}$ | $(P/l)_{C3H6}$ | $(P/l)_{C3H8}$ |
|---|---|---|---|---|---|
| 24.68 | 2.00 | 7.86 | 2.45 | 7.02 | 0.49 |

*Permeance unit: gas permeation unit (GPU)

As shown in Table 5, the permeate has very low levels of paraffin (ethane and propane) in comparison to paraffin levels in the feed, thereby demonstrating the effectiveness of the membrane module in separating olefins and paraffins. Methane and ethane have similar permeance values (Table 6) such that methane is also effectively separated from olefins as shown in Table 5, albeit less effectively than propane separation from the feed. Due to its small size relative to other components of the feed, hydrogen has a higher permeance than all of the other feed components. Hydrogen removal from the permeate can be effected by other means if desired.

EX 5

Replicate Ex 3, but change the feed to a gas mixture that contains acetylene ($C_2H_2$) such as that suitable for feed to a front end acetylene hydrogenation reactor. Table 7 below shows gas mixture composition. Table 8 below summarizes transport properties.

TABLE 7

| Gas | Feed (mol %) | Permeate (mol %) |
|---|---|---|
| $H_2$ | 24.1 | 60.6 |
| $CH_4$ | 24.1 | 6.8 |
| $C_2H_4$ | 30.2 | 24.0 |
| $C_3H_6$ | 7.3 | 4.6 |
| $C_2H_6$ | 8.0 | 2.0 |

TABLE 7-continued

| Gas | Feed (mol %) | Permeate (mol %) |
|---|---|---|
| $C_3H_8$ | 6.3 | 0.35 |
| $C_2H_2$ | 0.32 | 0.93 |
| $C_3H_4$ (Propadiene) | 0.05 | 0.26 |
| $C_3H_4$ (Methylacetylene) | 0.11 | 0.48 |

TABLE 8*

| $(P/1)_{H2}$ | $(P/1)_{CH4}$ | $(P/1)_{C2H4}$ | $(P/1)_{C2H6}$ | $(P/1)_{C3H6}$ | $(P/1)_{C3H8}$ | $(P/1)_{C2H2}$ | $(P/1)_{MA}$ | $(P/1)_{PD}$ |
|---|---|---|---|---|---|---|---|---|
| 27.2 | 3.05 | 8.62 | 2.65 | 6.87 | 0.59 | 31.76 | 47.05 | 53.76 |

*Permeance unit: gas permeation unit (GPU)

The data in Tables 7 and 8 show that nearly 90 mol % of the permeate is hydrogen, ethylene and propylene and that acetylene content ($C_2H_2$, $C_3H_4$ (propadiene) and $C_3H_4$ (methacetylene) increases from 0.48 mol % to 1.67 mol %. The acetylenes may, if desired, be converted to ethylene and propylene in a subsequent hydrogenation step.

EX 6

Effect pyrolysis as in Ex 1, but change the heating protocol as follows: a) Heat from 50° C. to 250° C. at a ramp rate of 13.3° C. per minute (° C./min); b) Heat from 250° C. to 485° C. at a ramp rate of 3.85° C./min; c) Heat from 485° C. to 500° C. at a ramp rate of 0.25° C./min; and d) Soak at 500° C. for 2 hours. Table 9 below summarizes transport properties and shows that one can extend the pyrolysis protocol to 500° C.

TABLE 9*

| $(P/1)_{C2H4}$ | $(P/1)_{C2H6}$ | $(P/1)_{C3H6}$ | $(P/1)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 16.5 | 3.8 | 12.7 | 0.59 | 4.3 | 21.4 | 1.3 | 3.3 |

*Permeance unit: gas permeation unit (GPU)

EX 7

Prepare precursor fibers using a modification of the process of Ex 1. First, substitute 6FDA-DAM for 6FDA/BPDA-DAM, the 6FDA-DAM polyimide powder being synthesized by a condensation reaction as in Ex 1 using 2,4,6-trimethyl-1,3-phenylene diamine and 5,5'-[2,2,2-trifluoro-1-(trifluoromethyl)ethylidene]-1,3-isobenzofurandion as monomers. Second, change the spinning dope to comprise 22 wt % 6FDA-DAM, 43 wt % NMP, 25 wt % EtOH and 10 wt % THF, all wt % numbers being based on total spinning dope weight. Third, change the dope and bore fluid flow rates to 50 mL/hr. Fourth, change the air gap from 2 cm to 30 cm.

The resultant precursor fibers have a 3.5 $O_2/N_2$ selectivity, the same as the polymer intrinsic value, an indication that the precursor membrane is defect-free.

Convert the precursor fibers to a pyrolyzed fiber membrane module as in Ex 1 and test the membrane for pure gas permeation also as in Ex 1. Table 10 below summarizes transport properties for the membrane. A comparison of this Ex 7 with Ex 2 and Ex 6 shows that the membrane performance is similar to that of Ex 2 and Ex 6, thereby demonstrating that the 6FDA-DAM derived carbon membrane also has the mixed olefin/paraffin selectivity feature shown for 6FDA/BPDA-DAM derived carbon membrane.

TABLE 10*

| $(P/1)_{C2H4}$ | $(P/1)_{C2H6}$ | $(P/1)_{C3H6}$ | $(P/1)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 10.5 | 2.5 | 11.9 | 0.74 | 4.2 | 16.0 | 0.88 | 4.8 |

*Permeance unit: gas permeation unit (GPU)

EX 8

Prepare precursor fibers using a modification of the process of Ex 1. First, substitute a commercially available polyimide, MATRIMID™ 5218 for 6FDA/BPDA-DAM. Second, change the spinning dope to comprise 26.2 wt % MATRIMID 5218, 53 wt % NMP, 14.9 wt % EtOH and 5.9 wt % THF, all wt % numbers being based on total spinning dope weight. Third, change the dope and bore fluid flow rates respectively to 180 mL/hr and 60 mL/hr. Fourth, change the spinneret temperature to 60° C. and the water quench temperature to 47° C. Fifth, change the air gap from 2 cm to 10 cm and the take-up rate from 5 M/min to 15 M/min Convert the precursor fibers to a pyrolyzed fiber membrane module as in Ex 1 and test the membrane for pure gas permeation also as in Ex 1. Table 11 below summarizes transport properties for the membrane.

TABLE 13*

| $(P/1)_{C2H4}$ | $(P/1)_{C2H6}$ | $(P/1)_{C3H6}$ | $(P/1)_{C3H8}$ | $\alpha_{C2H4/C2H6}$ | $\alpha_{C3H6/C3H8}$ | $\alpha_{C2H4/C3H6}$ | $\alpha_{C3H6/C2H6}$ |
|---|---|---|---|---|---|---|---|
| 2.1 | 0.54 | 1.06 | 0.034 | 3.8 | 31 | 1.98 | 1.96 |

*Permeance unit: gas permeation unit (GPU)

Table 13 shows that the pyrolyzed membrane shows ethylene and propylene permeance values that exceed those of, respectively, ethane and propane, albeit somewhat lower than the permeance values provided above for 6FDA/BPDA-DAM and 6FDA-DAM derived carbon membranes. The lower permeance values for MATRIMID 5218 may be due, in part, to some substructure collapse of the precursor fibers during pyrolysis. The higher permeance values make 6FDA/BPDA-DAM and 6FDA-DAM derived carbon membranes more desirable than MATRIMID 5218 derived carbon membranes with respect to treating a feedstream to separate multiple olefins from their corresponding paraffins.

What is claimed is:

1. A process for separating an olefin from a gaseous mixture comprising the olefin admixed with its corresponding paraffin, the process comprising
    flowing the gaseous mixture through a hollow fiber carbon molecular sieve, wherein the gaseous mixture is comprised of a first and second olefin, the first olefin having one less carbon than the second olefin, and their corresponding first and second paraffin and the hollow fiber carbon molecular sieve has a second olefin/first paraffin selectivity of at least 2.6 whereby the first and second olefin preferentially pass through the hollow fiber carbon molecular sieve forming a permeate gas and the first and second paraffin are preferentially retained forming a retentate gas, and
    separating the retentate gas and permeate gas.

2. The process of claim 1, wherein the second olefin/first paraffin selectivity is at least 3.3.

3. The process of claim 2, wherein the two olefins are ethylene and propylene and the corresponding paraffins are ethane and propane.

4. The process of claim 1 wherein the gaseous mixture also comprises at least one additional gaseous component selected from a group consisting of acetylene, hydrogen, propadiene and methylacetylene and the conditions are sufficient to cause at least a portion of the additional gaseous component(s) and at least a portion of the olefin(s) to pass through the sieve while blocking passage of at least a portion of the corresponding paraffins through the sieve.

5. The process of claim 4, further comprising an additional step wherein gases that pass through the sieve are subjected to a second separation using either the same claim 1 hollow fiber carbon molecular sieve or a second claim 1 hollow fiber carbon molecular sieve, said second separation occurring under conditions sufficient to cause at least a portion of the additional gaseous component(s) to pass through the hollow fiber carbon molecular sieve while blocking passage of at least a portion of the olefin(s) through the hollow fiber carbon molecular sieve.

6. A process for preparing a hollow fiber carbon molecular sieve membrane, such process comprising a series of sequential steps:
    a. Using a combination of spinning conditions, converting a spinning dope to a hollow fiber membrane, the spinning dope comprising from 15 percent by weight to 35 percent by weight of a polyimide, from 20 percent by weight to 85 percent by weight of low volatility water soluble solvent, from 0 percent by weight to 10 percent by weight of non-volatile non-solvents, from 0 percent by weight to 40 percent by weight of volatile water soluble non-solvents, and from 0 percent by weight to 85 percent by weight of a volatile water soluble organic solvent, each weight percentage by weight being based upon total weight of the spinning dope and when added together for a spinning dope equal 100 percent by weight;
    b. Pyrolyzing the hollow fiber membrane at a temperature within a range of from 450 degrees centigrade to 900 degrees centigrade using a purge gas that comprises an inert gas and oxygen, the oxygen being present in an amount of from greater than 0 moles per million moles of purge gas to less than or equal to 50 moles per million moles of purge gas, the purge gas flowing at a rate within a range of from 2 centimeters per minute to 100centimeters per minute;
    c. Subjecting the pyrolized hollow fiber membrane to a post-pyrolysis treatment that comprises conditioning the pyrolyzed hollow fiber membrane in an atmosphere that is substantially free of water, water vapor, gaseous organic compounds and organic liquids for a period of time at least 72 hours after cooling from the final pyrolysis temperature to room temperature before exposure to feed gas, said combination of sequential steps yielding an olefin-paraffin hollow fiber carbon molecular sieve membrane that has an ethylene permeance at least 0.1 gas permeation units, a propylene permeance at least 0.1 gas permeation units, provided that the ethylene permeance is at least 2 times that of the ethane permeance and the propylene permeance is at least 4 times that of the propane permeance and further provided that propylene permeance is at least 1.5 times that of the ethane permeance.

7. The process of claim 6, wherein the combination of spinning conditions comprises a spinning dope flow rate per threadline within a range of from 50 to 500milliliters per hour, a bore fluid flow rate within a range of from 50 to 500 milliliters per hour, a spinneret temperature within a range of from 20 degrees centigrade to 90 degrees centigrade, a water quench temperature within a range of from 0 degrees centigrade to 65degrees centigrade, an air gap within a range of from 0.1 to 50 centimeters, and a fiber take-up rate within a range of from 1 to 100 meters per minute.

8. The process of claim 6 wherein the atmosphere of step c is comprised of a subatmospheric pressure within a range of from 0.1 Pascals to 2000 Pascals for a period of time at least 12 hours.

9. The process of claim 6, wherein pyrolysis step b comprises substeps as follows:
 1). Heating the hollow fiber membrane to the temperature; and
 2). Maintaining the heated hollow fiber membrane at the temperature for a period of time within a range of from 1 minute to 500 minutes.

10. The process of claim 9, wherein the temperature is within a range of from 500° C. to 560° C.

11. The process of claim 6, wherein the propylene permeance/ethane permeance is at least 20% greater to a hollow membrane that has not been subject to the post pyrolysis treatment.

12. The process of claim 6, wherein the polyimide is a 6FDA/BPDA-DAM polyimide.

* * * * *